US012307503B2

(12) United States Patent
DeBardlebon et al.

(10) Patent No.: US 12,307,503 B2
(45) Date of Patent: May 20, 2025

(54) ORDER QUEUE OPTIMIZATION

(71) Applicant: NCR Voyix Corporation, Atlanta, GA (US)

(72) Inventors: Zachary Christopher DeBardlebon, Atlanta, GA (US); Zachary Taylor Lasater, Atlanta, GA (US); Kip Oliver Morgan, Atlanta, GA (US)

(73) Assignee: NCR Voyix Corporation, Atlanta, GA (US)

( * ) Notice: Subject to any disclaimer, the term of this patent is extended or adjusted under 35 U.S.C. 154(b) by 389 days.

(21) Appl. No.: 17/389,498

(22) Filed: Jul. 30, 2021

(65) Prior Publication Data

US 2023/0031816 A1 Feb. 2, 2023

(51) Int. Cl.
*G06Q 30/00* (2023.01)
*G06F 9/54* (2006.01)
*G06N 20/00* (2019.01)
*G06Q 10/0631* (2023.01)
*G06Q 30/0601* (2023.01)
*G06Q 50/12* (2012.01)

(52) U.S. Cl.
CPC ......... *G06Q 30/0635* (2013.01); *G06F 9/54* (2013.01); *G06N 20/00* (2019.01); *G06Q 10/06312* (2013.01); *G06Q 50/12* (2013.01)

(58) Field of Classification Search
CPC ................................................. G06Q 30/0635
See application file for complete search history.

(56) References Cited

U.S. PATENT DOCUMENTS

| | | | | |
|---|---|---|---|---|
| 10,402,920 | B2 * | 9/2019 | Fox | G06Q 50/12 |
| 11,270,372 | B2 * | 3/2022 | Kumar | G06Q 30/0635 |
| 11,508,000 | B2 * | 11/2022 | Rajkhowa | G06Q 30/0635 |
| 11,699,163 | B2 * | 7/2023 | Burke | G06Q 30/0201 |
| | | | | 705/7.29 |
| 2017/0278204 | A1 * | 9/2017 | Mimassi | G06Q 50/12 |
| 2018/0075404 | A1 * | 3/2018 | Hendrickson | G06Q 50/40 |
| 2019/0222540 | A1 * | 7/2019 | Relangi | H04M 3/42042 |
| 2021/0103698 | A1 * | 4/2021 | Vuoristo | G06F 40/289 |

(Continued)

OTHER PUBLICATIONS

Kyritsis, Athanasios I., and Michel Deriaz. "A machine learning approach to waiting time prediction in queueing scenarios." 2019 Second International Conference on Artificial Intelligence for Industries (AI4I). IEEE, 2019.*

*Primary Examiner* — Kathleen Palavecino
(74) *Attorney, Agent, or Firm* — Schwegman Lundberg & Woessner, P.A.

(57) ABSTRACT

When a new order is received and is to be inserted into an unprepared order queue for order preparation. The new order's items and items' ingredients are obtained along with expected preparation/cook time for each ingredient. Items and ingredients for the orders that are already in the queue are also inspected along with the times that each order was placed in the queue. A machine-learning model is processed with the data associated with the orders and the new order. The model returns an optimized rearrangement of the queue with the new order inserted into the queue that levels out the expected order wait times, reduces variations in order wait times, and minimizes order preparation times based on the rearranged/modified queue. The optimized queue is presented on a display associated with staff responsible for preparing the orders of the queue.

8 Claims, 3 Drawing Sheets

(56) References Cited

U.S. PATENT DOCUMENTS

2022/0166883 A1* 5/2022 Bohannon ............... H04L 67/30
2023/0297906 A1* 9/2023 Garcia-Brosa ..... G06Q 10/0833
 705/7.13

* cited by examiner

ORDER QUEUE OPTIMIZATION

BACKGROUND

Kitchens producing orders for customers have inconsistent food preparation times. Sometimes an order might take thirty minutes where another order takes one minute. This is usually due to kitchen staff having to prepare everything in each of the orders in the order queue.

As another example, consider an employee on a time-constrained lunch hours, waiting for an order to be prepared can result in the employee being late in returning back to the office. Also, third-party delivery service drivers make less money if they must wait around for kitchen staff to prepare their delivery orders.

The problem is not limited to kitchen staff being late with order preparation, sometimes the staff prepares an order too soon. Many customers now order ahead, via mobile applications or via phone calls; these customers do not expect their orders to be completely immediately and are usually expecting to pickup their orders at a predefined time. Unfortunately, many kitchen-order systems do poor order queue management and often insert orders into the order queue based on when the order was received and not based on when the order is expected to be picked up by a given customer. As a result, when an order-ahead customer comes in to the establishment to pickup his/her order, the order was prepared earlier and has been sitting waiting on customer pickup, such that the order is now cold.

Businesses rely on customer reviews and establishments that consistently take too long to fulfill orders or fulfill orders well in advance of expected customer pickup times, often receive negative social media reviews.

Accordingly, there is a need for intelligent order queue management that minimizes delays in order preparation and that minimizes order preparation, which results in the order sitting for too long before the ordering customer pickups the order.

SUMMARY

In various embodiments, methods and a system for order queue optimization.

According to an embodiment, a method for order queue optimization is presented. As an example, a current order associated with a customer of an establishment is received. Item information for the current order and a queue of pending orders associated with the establishment are obtained. The current order is inserted into the queue and the queue is rearranged based on the item information to optimize preparation of queue orders and to minimize variations in wait times on the preparation of the queue orders.

DETAILED DESCRIPTION

Figure 1:
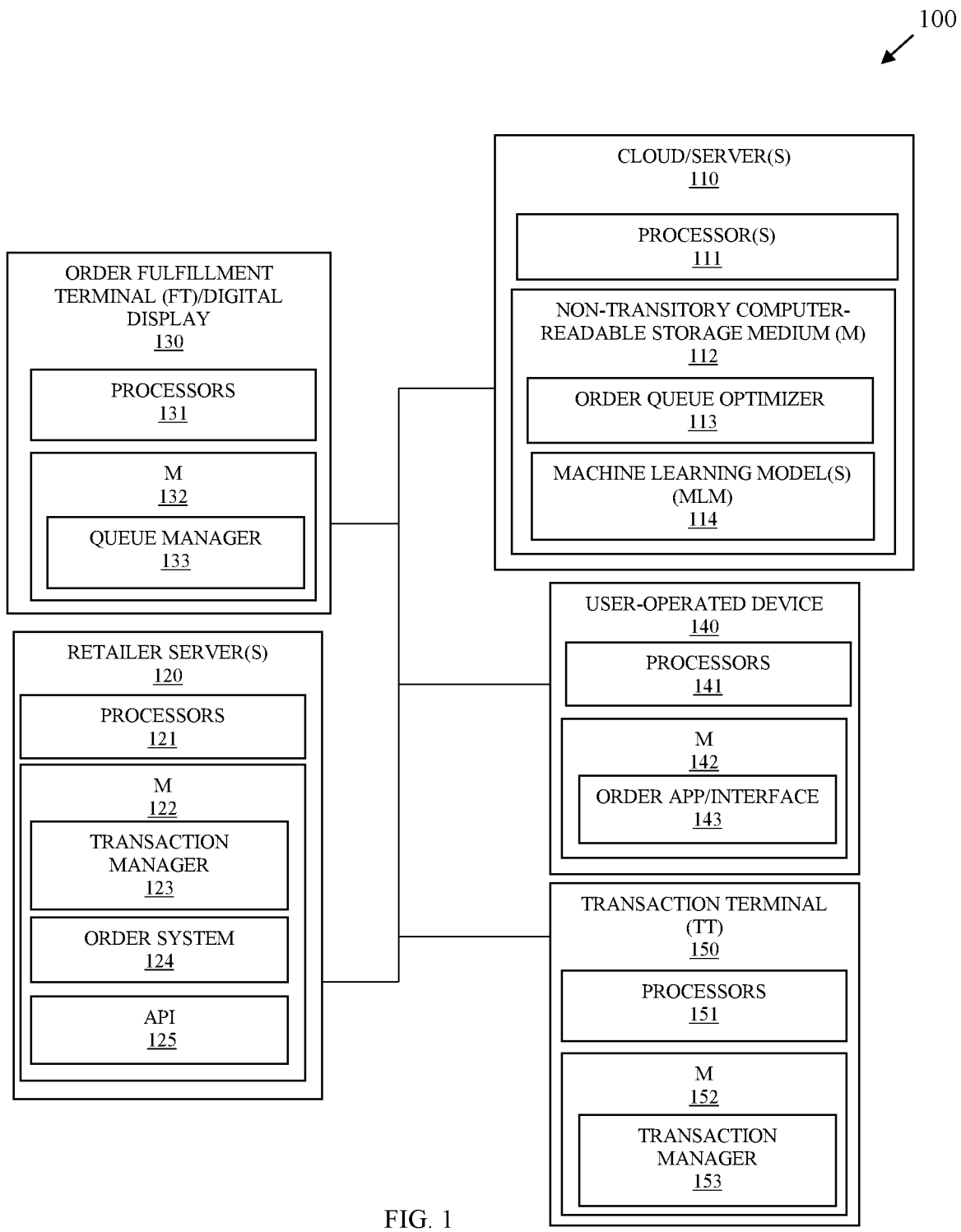
FIG. 1 is a diagram of a system for order queue optimization, according to an example embodiment.

FIG. 1 is a diagram of a system/platform 100 for order queue optimization, according to an example embodiment. It is to be noted that the components are shown schematically in greatly simplified form, with only those components relevant to understanding of the embodiments being illustrated.

Furthermore, the various components (that are identified in system/platform 100) are illustrated and the arrangement of the components are presented for purposes of illustration only. It is to be noted that other arrangements with more or less components are possible without departing from the teachings of providing order queue optimization, presented herein and below.

System/platform 100 (herein after just "system 100") provides a processing environment by which retailers can provides a current order queue at a given store/kitchen of the retailers and receive back an optimal rearrangement of the orders in the queue for preparation by kitchen staff. The optimized queue accounts for the preparation and cook times associated with ingredients of the order. The queue is optimized so as to level out customer wait times and ensure that every customer experiences a same or similar wait time for their order regardless of the items of the order. As new orders are received by the kitchen, the ingredients needed for the orders are obtained and the expected or estimated cook/preparation times are calculated, and the current order queue is inspected in view of the expected or estimated cook/preparation times. The new orders are then optimally placed in the queue on behalf of the kitchen. The kitchen staff is completely unaware of the processing performed by system 100. Interaction between the kitchen is maintained by the backend server order system of the kitchen. The backend order system is provided an API to interact with a cloud-based order queue optimizer that performs the queue optimization on behalf of the kitchen.

System 100 comprises a cloud/server 110, one or more retailer servers 120, one or more order fulfillment terminals/digital displays 130, a plurality of user-operated devices 140, and one or more transaction terminals 150.

Cloud/Server 110 comprises at least one processor 111 and a non-transitory computer-readable storage medium 112. Medium 112 comprises executable instructions for an order queue optimizer 113 and one or more machine-learning models (MLMs) 114. The executable instructions when provided to and executed by processor 111 from medium 112 cause processor 111 to perform the processing discussed herein and below for order queue optimizer 113 and model(s) 114 for purposes of optimizing a given kitchen's (store's) order queue for order preparation and order fulfillment by kitchen staff of the kitchen.

Each retailer server 120 comprises at least one processor 121 and a non-transitory computer-readable storage medium 122. Medium 122 comprises executable instructions for a transaction manager 123, an order system 124, and an Application Programming Interface (API) 135. The executable instructions when provided to and executed by processor 121 from medium 122 cause processor 121 to perform the processing discussed herein and below for transaction manager 123, order system 124, and API 125

Each order fulfillment terminal/digital sign 130 comprises at least one processor 131 and a non-transitory computer-readable storage medium 132. Medium 132 comprises executable instructions for a queue manager 133. The executable instructions when provided to and executed by processor 131 from medium 132 cause processor 131 to perform the processing discussed herein and below for queue manager 133.

Each user-operated device comprises at least one processor 141 and a non-transitory computer-readable storage medium 142. Medium 142 comprises executable instructions for an order application (app)/interface 143. The executable instructions when provided to and executed by processor 141 from medium 142 cause processor 141 to perform the processing discussed herein and below for order app/interface 143.

Each transaction terminal 150 comprises at least one processor 151 and a non-transitory computer-readable storage medium 152. Medium 152 comprises executable instructions for a transaction manager 153. The executable instructions when provided to and executed by processor 151 from medium 152 cause processor 151 to perform the processing discussed herein and below for transaction manager 153.

Initially, a given retailer associated with server 120 and a kitchen associated with terminal/display 130 maintains a database of menu items, ingredients used with each menu item, and expected cook time or preparation time of each ingredient. As orders are fulfilled by the kitchen, the actual cook and preparation time for each of the ingredients of each menu item is updated into the database.

In an embodiment, the database is maintained from the cloud by cloud/server 110 on behalf of the retailer. Order system 124 uses API 125 to communicate the menu items, ingredients of each menu item, expected cook time or preparation time of each ingredient, and actual cook time or preparation time for each ingredient of each menu item for orders once fulfilled.

In an embodiment, order queue optimizer 113 is granted access to access the database from the processing environment of server 120, such that order system 124 does not have to communicate the above-referenced information to order queue optimizer 113 via API 125.

Order queue optimizer 113 trains machine-learning model 114 on historical order queues and orders labeled as input data to the model 114 and expected output from the model 114 following the training session. The input data comprises: a current order that is to be placed in a given queue, a size of the current order in terms of menu items and quantity of each menu item for the corresponding order, ingredients for each item in the current order, expected prep/cook time for each ingredient, a current time of day that the current order was received, a last prepared order associated with the given queue, a time previously required to prepare a last similar order that is similar to the current order, the current queue of orders before inserting the current order, along with each order's menu items, size of the corresponding order in terms of total number of items in that order, ingredients for each menu item, a time of day that the corresponding order was received, any scheduled or delayed pickup time associated with the corresponding order, and expected prep/cook time of each ingredient. The expected out that the model 114 is to produce (based on the input data after inserting the current order into the given queue) is also provided for the training session with model 114. The module 114 configures itself on the input data to produce the optimal reconfiguration of the given queue with the current order inserted into the queue based on the expected output provided during the training session.

The model 114 derives one or more regression-based algorithms (and/or derives a neural network) that when provided a current order, a last prepared order, a last experienced prep/cook time for a similar order to the current order, and a current queue along with the above-mentioned supporting input data (time each order was placed in queue, current time of day for the current order, any scheduled or delayed pickup time, ingredients, prep/cook time of each ingredient) produces a new queue rearrangement with the current order inserted and that is optimized to smooth out or even out the average wait times that each customer can expect when placing an order and reduces prep times for the queue as a whole.

Model 114 may also be trained on other input data as well such as a maximum wait time that no customer should have to wait longer than to receive their fulfilled order. In some cases, a minimum wait time that each customer should expect to wait for an order. Also, an optimal average wait time that each customer regardless of order can be expected to wait. The max wait time, minimum wait time, and/or optimal average wait time may be dynamic parameters provided by order queue optimizer 113 to model 114 for each managed queue of a given kitchen, such that order queue optimizer 113 may dynamically change the optimal average wait time based on a given size of a given queue.

Order queue optimizer 113 obtains the input data consumed by model 114 and performs some preprocessing on that data as each new order is received and needs to be inserted into the queue. For example, the database (discussed above) has actual prep/cook times for the ingredients for all orders associated with those ingredients. Order queue optimizer 113 provides an average prep/cook time for each ingredient listed in the input data to model 114. Order queue optimizer 113 may also obtain the last prepared order (and its details—items—ingredients, prep/cook times, etc.), identify from the database a similar order to the current order that was last prepared by the kitchen (based on menu items and/or ingredients and current time of the current order), and obtain the preparation time of that last prepared similar order. Order queue optimizer 113 obtains all the input data for the queue, the current order, the last prepared order, and the last prepared similar order and the order queue optimizer 113 provides to model 114. Model 114 returns a rearrangement of the orders in the queue as an optimal order preparation/fulfillment arrangement within any dynamically provided constraints identified by the order queue optimizer 113 (such as optimal average wait time, maximum wait time, minimum wait time).

The optimal rearranged queue is provided by order queue optimizer 113 to order system 124 using API 125. Order system 124 interacts with queue manager 133 and provides the rearranged and optimized queue. Queue manager 133 displays the rearranged and optimized queue on displays interfaced to terminal/digital display 130. Kitchen staff fulfills/prepares the orders in the queue in sequential order as presented on the displays.

It is noted that any order of the queue that is actively being prepared by the kitchen staff is not considered to be part of the queue by order queue optimizer 133, such that only the next in line order that is not being worked on is considered to be part of the queue that is passed to model 114 for optimal rearrangement. This ensures that the kitchen staff does not beginning preparing an order only to stop when they discover that the order being worked on was bumped back in the queue.

During operation of system 100, transaction manager 123 receives orders that are placed with order system 124. Order system 124 maintains the queue for the kitchen associated with terminal/digital sign 130. Customers can place orders in a variety of manners, such as through a kiosk (transaction terminal 150) using a transaction interface to transaction manager 153. Transaction manager 153 interacts with transaction manager 123 to complete the order, which is then placed by transaction manager 123 with order system 124. In another case, customers can place orders through order/ app interface 143 that directly interacts with transaction manager 123 and manager 123 places the order with order system 124.

Order system 124 provides current orders that need to be inserted into the queue to order queue optimizer via API 125. Order system 124 may also provided the current queue of orders via API 125 with each current order; although this could also be maintained and managed separately by order queue optimizer 113. As orders are selected for preparation and fulfilled, order system 124 updates the queue with this information along with the actual prep/cook times of the ingredients of items of the order. Order queue optimizer 113 has access to the queue or is provided the updated information by order system 124 through API 125. When a new order is received, order queue optimizer obtains the input data and provides to model 114, a modified queue is provided as output with the new order placed in the modified queue. Optimizer 112 communicates the modified queue to order system 124 through API 125. Order system 124 communicates the modified queue to queue manager 133, and queue manager 133 presents the modified queue on displays associated with terminal/digital display 130 within a kitchen that is fulfilling/preparing the orders associated with the queue.

It is noted that the queue itself is a data structure comprising order identifiers, menu item identifiers, ingredient identifiers, and metadata. Each cell of the data structure represents a particular order identifier; each cell is also a separate and embedded data structure comprising item identifiers, ingredient identifiers, and metadata. The cells are arranged sequentially, such that the first cell represents the next order that is to be worked on/prepared by the corresponding kitchen staff. The metadata can include the input data discussed above, such as time of day that a given order was received for queue insertion, average prep/cook time per ingredient, etc. Thus, order queue optimizer 113 is able to quickly and rapidly prepare the input data needed by module 114 and module 114 provides a quick response time on providing a modified queue that is rearranged with a current order inserted in the modified queue. In fact, new orders are near instantaneously inserted into a modified and optimized queue and provided to order system 124 in real time.

System 100 provides optimal queue management of order queues that provide a level and average wait time to all customers of a store/establishment without large deviations being experienced by the customers. This allows staff to efficiently work on orders, reduce preparation times, and provides customers with a consistent degree of expectations on their order preparation wait times.

In an embodiment, the user-operated devices is a mobile phone, a tablet, a laptop, a desktop, a wearable processing device, or a network and speech enabled device, such as Google Home®, Amazon Echo®, etc.

In an embodiment, the order app/interface 143 is a mobile application or a browser-based interface.

In an embodiment, the transaction terminal 150 is a Self-Service Terminal (SST), a kiosk, an Automated Teller Machine (ATM), or a Point-Of-Sale (POS) terminal.

Figure 2:
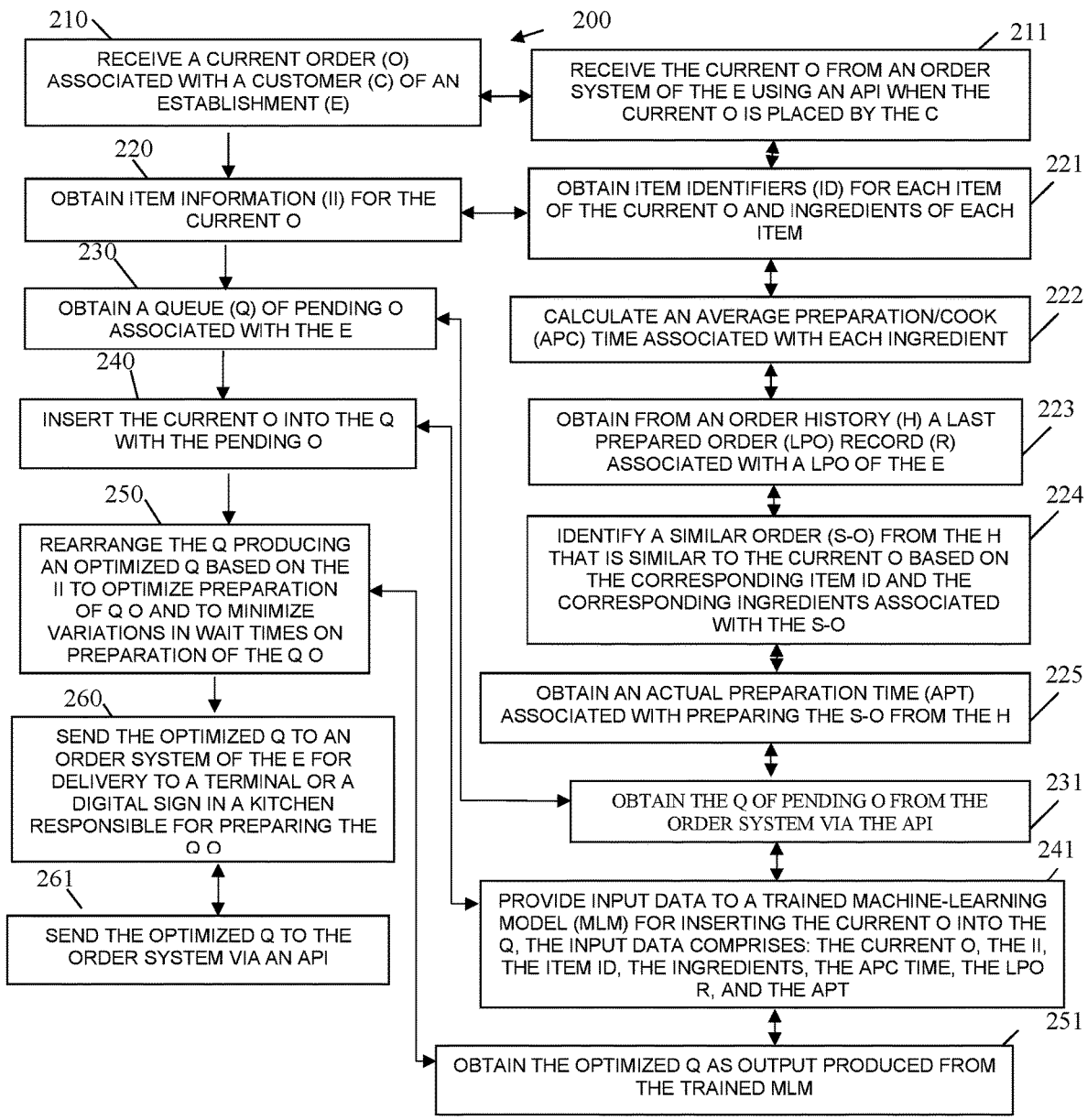
FIG. 2 is a diagram of a method for order queue optimization, according to an example embodiment.
Figure 3:
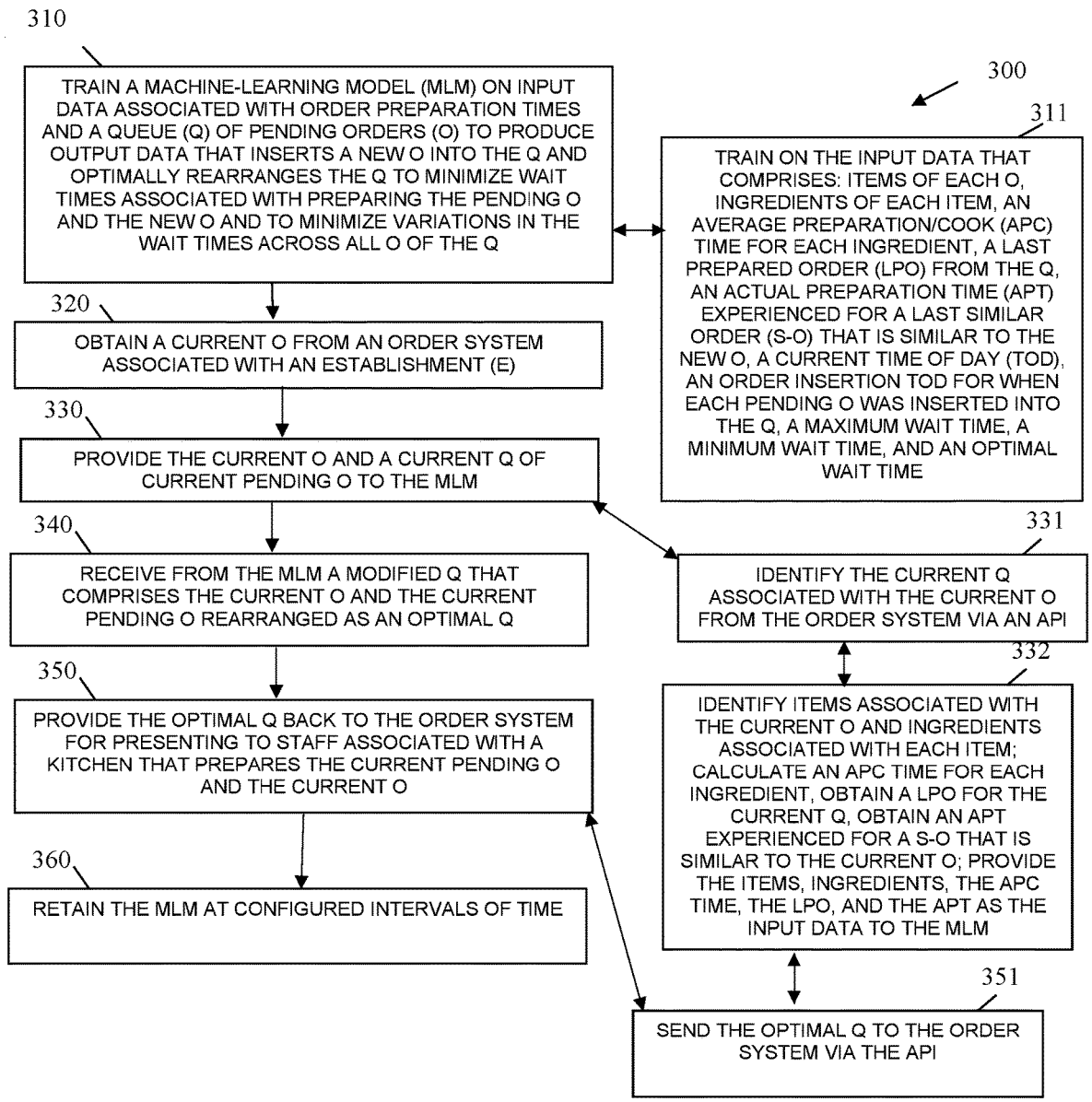
FIG. 3 is a diagram of another method for order queue optimization, according to an example embodiment.

The above-referenced embodiments and other embodiments are now discussed within FIGS. 2-3.

FIG. 2 is a diagram of a method 200 for order queue optimization, according to an example embodiment. The software module(s) that implements the method 200 is referred to as an "order queue optimizer." The order queue optimizer is implemented as executable instructions programmed and residing within memory and/or a non-transitory computer-readable (processor-readable) storage medium and executed by one or more processors of one or more devices. The processor(s) of the device that executes the order queue optimizer are specifically configured and programmed to process the order queue optimizer. The order queue optimizer may have access to one or more network connections during its processing. The network connections can be wired, wireless, or a combination of wired and wireless.

In an embodiment, the device that executes the order queue optimizer is cloud 110. In an embodiment, cloud 110 comprises a plurality of servers logically cooperating and accessible as a single server 110 (cloud 110).

In an embodiment, the order queue optimizer is all or some combination of 113, and/or 114.

At 210, the order queue optimizer receives a current order associated with a customer of an establishment. The customer may place an order from a user-operated device 140 (tablet, phone, laptop, wearable processing device, etc.) of the customer may initiate the order from a transaction terminal 150 of the retailer (specialized shopping portable device, SST, kiosk, ATM, etc.).

In an embodiment, at 211, the order queue optimizer receives the current order from an order system 124 of the establishment (retailer) using an API 125 when the current order is placed by the customer with the establishment.

At 220, the order queue optimizer obtains item information for the current order. This can include a variety of information as was discussed above with system 100 of FIG. 1.

For example, in an embodiment of 211 and 220, at 221, the order queue optimizer obtains item identifiers for each item of the current order along with ingredients of each item.

In an embodiment of 221 and at 222, the order queue optimizer calculates an average preparation/cook time associated with each ingredient. This can be done by averaging the actual cook times for the ingredient from the database as was discussed above with system 100 of FIG. 1.

In an embodiment of 222 and at 223, the order queue optimizer obtains from an order history a last prepared order record associated with a last prepared order of the establishment.

In an embodiment of 223 and at 224, the order queue optimizer identifies a similar order from the order history that is similar to the current order based on the corresponding item identifiers and the corresponding ingredients of the current order being similar to the similar order.

In an embodiment of 224 and at 225, the order queue optimizer obtains an actual preparation time associated with preparing the similar order from the order history.

At 230, the order queue optimizer obtains a queue of pending orders associated with the establishment.

In an embodiment of 225 and 230, at 231, the order queue optimizer obtains the queue or a reference link to obtain the queue from the order system 124 via the API 125.

At 240, the order queue optimizer inserts the current order into the queue with the pending orders.

In an embodiment of 231 and 240, at 241, the order queue optimizer provides input data to a trained machine-learning model 114 for inserting the current order into the queue. The input data at least comprises, the current order, the item information, the item identifiers, the ingredients, the average preparation/cook time, the last prepared order, and the actual preparation time for the similar order.

At 250, the order queue optimizer rearranges the queue producing an optimized queue based on the item information to optimize preparation time when preparing the current order and the pending orders (queue orders) of the queue and to minimize variations in wait times on preparation of the queue orders.

In an embodiment of 241 and 250, at 251, the order queue optimizer obtains the optimized queue as output produced from the trained machine-learning module 114.

In an embodiment, at 260, the order queue optimizer sends the optimized queue to the order system 114 of the establishment for delivery to a terminal 130 or a digital sign 130 in a kitchen responsible for preparing the queue orders.

In an embodiment of 260 and at 261, the order queue optimizer sends the optimized queue to the order system 114 via an API 125 or sends a link to the optimized queue via API 125.

FIG. 3 is a diagram of another method 300 for order queue optimization, according to an example embodiment. The software module(s) that implements the method 300 is referred to as a "cloud-based order queue optimization service." The cloud-based order queue optimization service is implemented as executable instructions programmed and residing within memory and/or a non-transitory computer-readable (processor-readable) storage medium and executed by one or more processors of a device. The processors that execute the cloud-based order queue optimization service are specifically configured and programmed for processing the cloud-based order queue optimization service. The cloud-based order queue optimization service may have access to one or more network connections during its processing. The network connections can be wired, wireless, or a combination of wired and wireless.

In an embodiment, the device that executes the cloud-based order queue optimization service is cloud 110. In an embodiment, the device that executes the cloud-based order queue optimization service is server 110.

In an embodiment, the cloud-based order queue optimization service is all of or some combination of 125, 113, 114, and/or method 200 of FIG. 2.

The cloud-based order queue optimization service presents another and, in some ways, enhanced processing perspective of the what was discussed above for cloud 110 and method 200.

At 310, the cloud-based order queue optimization service trains a machine-learning model 114 on input data associated with order preparation times and a queue of pending orders to produce output data that inserts the new order into the queue and optimally rearranges the queue to minimize wait times associated with preparing the pending orders and the new order and to minimize variations in the wait times across all orders of the queue.

In an embodiment, at 311, the cloud-based order queue optimization service trains on the input data that comprises: items of each order, ingredients of each item, an average preparation/cook time for each ingredient, a last prepared order from the queue, an actual preparation time experienced for a last similar order that is similar to the new order, a current time of day, an order insertion time of data for when each pending order was inserted into the queue, a maximum wait time, a minimum wait time, and an optimal wait time.

At 320, the cloud-based order queue optimization service obtains a current order from an order system 124 associated with an establishment. The order recently placed by a customer of the establishment via a user operated device 140 or a transaction terminal 150 of the establishment.

At 330, the cloud-based order queue optimization service provides the current order and a current queue of current pending orders to the module 114.

In an embodiment, at 331, the cloud-based order queue optimization service identifies the current queue associated with the current order from the order system 124 via an API 125.

In an embodiment of 331 and at 332, the cloud-based order queue optimization service identifies items associated with the current order and ingredients associated with each item. The cloud-based order queue optimization service calculates an average preparation/cook time for each ingredient and obtains a last prepared order for the current queue. The cloud-based order queue optimization service obtains an actual preparation time experienced for a similar item that is similar to the current order and provides the items, the ingredients, the average preparation/cook time per ingredient, the last prepared order, and the actual preparation time as the input data to the module 124.

At 340, the cloud-based order queue optimization service receives from the module 124 a modified queue that comprises the current order and the current pending orders rearranged as an optimal queue.

At 350, the cloud-based order queue optimization service provides the optimal queue back to the order system 124 for presenting to staff associated with a kitchen that prepares the current pending order and the current order.

In an embodiment of 332 and 350, at 351, the cloud-based order queue optimization service sends the optimal queue to the order system 124 via an API 125 or sends a link or reference to the optimal queue to the order system 124 via the API 125.

In an embodiment, at 360, the cloud-based order queue optimization service retrains the model 124 at configured intervals of time.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
    training a cloud-based machine-learning model on input data associated with specific order preparation times and a queue of pending orders to produce output data that dynamically inserts a new order into the queue and intelligently rearranges the queue to minimize wait times associated with preparing the pending orders and the new order and to minimize variations in the wait times across all orders of the queue;

obtaining a current order from an order system associated with an establishment;

providing the current order and a current queue of current pending orders to the cloud-based machine-learning model as the input data;

receiving from the cloud-based machine-learning model a modified queue that comprises the current order and the current pending orders rearranged as an optimal queue;

wherein the cloud-based machine-learning model is specifically configured to account for real-time kitchen operational status and dynamically adjust the optimal queue based on actual cooking times and kitchen capacity;

wherein the input data comprises a size of each order in terms of menu items and quantity of each menu item, ingredients for each item, expected prep/cook time for each ingredient, a current time of day that each order was received, any scheduled or delayed pickup time associated with each order, and a time previously required to prepare a last similar order that is similar to the new order; and providing the optimal queue back to the order system for presenting to staff associated with a kitchen that prepares the current pending orders and the current order;

wherein the cloud-based machine-learning model derives one or more regression-based algorithms that when provided the input data produces the optimal queue that smooths out and evens out average wait times that each customer can expect when placing an order and reduces preparation times for the queue as a whole.

2. The method of claim 1, wherein training further includes training the cloud-based machine-learning model on the input data that comprises items of each order, ingredients of each item, an average preparation/cook time for each ingredient, a last prepared order from the queue, an actual preparation time experienced for a last similar order that is similar to the new order, a current time of day, an order insertion time of day for when each pending order was inserted into the queue, a maximum wait time for preparation of any order within the queue, a minimum wait time for preparation of any order within the queue, and an optimal wait time for preparation of any order within the queue.

3. The method of claim 1, wherein providing the current order further includes identifying the current queue associated with the current order from the order system using an Application Programming Interface (API).

4. The method of claim 3, wherein providing the current order further includes identifying items associated with the current order and ingredients associated with each item, calculating an average preparation/cook time associated with each ingredient, obtaining a last prepared order for the current queue, obtaining an actual preparation time experienced for a similar order that is similar to the current order, and providing the items, ingredients, the average preparation/cook time, the last prepared order, and the actual preparation time as the input data to the cloud-based machine-learning model.

5. The method of claim 4, wherein providing the optimal queue further includes sending the optimal queue to the order system via the API.

6. The method of claim 1 further comprising:
retraining the cloud-based machine-learning model at configured intervals of time.

7. A system, comprising:
a cloud processing environment comprising at least one server;
the at least one server comprising a processor and a non-transitory computer-readable storage medium;
the non-transitory computer-readable storage medium comprises executable instructions; and
the executable instructions when executed on the processor from the non-transitory computer-readable storage medium cause the processor to perform operations comprising:

training a cloud-based machine-learning model on input data associated with specific order preparation times and a queue of pending orders to produce output data that dynamically inserts a new order into the queue and intelligently rearranges the queue to minimize wait times associated with preparing the pending orders and the new order and to minimize variations in the wait times across all orders of the queue;

wherein the input data comprises a size of each order in terms of menu items and quantity of each menu item, ingredients for each item, expected prep/cook time for each ingredient, a current time of day that each order was received, any scheduled or delayed pickup time associated with each order, and a time previously required to prepare a last similar order that is similar to the new order;

obtain a current order from an order system associated with an establishment;

provide the current order and a current que of current pending orders to the cloud-based machine-learning model;

receive from the cloud-based machine-learning model a modified queue that comprises the current order and the current pending orders rearranged as an optimal queue, wherein the cloud-based machine-learning model is specifically configured to account for real-time kitchen operational status and dynamically adjust the optimal queue based on actual cooking times and kitchen capacity; and provide the optimal queue back to the order system for presenting to staff associated with a kitchen that prepares the current pending orders and the current order;

wherein the cloud-based machine-learning model derives one or more regression-based algorithms that when provided the input data produces the optimal queue that smooths out and evens out average wait times that each customer can expect when placing an order and reduces preparation times for the queue as a whole.

8. The system of claim 7, wherein the executable instructions when executed on the processor from the non-transitory computer-readable storage medium further cause the processor to perform additional operations comprising:
sending the optimal queue back to the order system via an Application Programming Interface (API).

* * * * *